United States Patent
Lasson

(10) Patent No.: US 7,135,088 B2
(45) Date of Patent: Nov. 14, 2006

(54) METHOD OF PRODUCING PACKAGING MATERIAL IN THE FORM OF A CONTINUOUS LAMINATE WEB

(75) Inventor: Rolf Lasson, Lund (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 7 days.

(21) Appl. No.: 10/760,306

(22) Filed: Jan. 21, 2004

(65) Prior Publication Data

US 2004/0149381 A1   Aug. 5, 2004

Related U.S. Application Data

(63) Continuation of application No. 08/384,596, filed on Feb. 3, 1995, now abandoned, which is a continuation of application No. 08/132,202, filed on Oct. 6, 1993, now abandoned.

(30) Foreign Application Priority Data

Oct. 13, 1992   (SE) .................................... 9203007

(51) Int. Cl.
  *B32B 37/00* (2006.01)
  *B32B 7/00* (2006.01)
(52) U.S. Cl. .................. 156/308.2; 156/324; 156/549; 156/550; 428/121; 428/139; 428/344; 428/464
(58) Field of Classification Search .................... None
  See application file for complete search history.

(56) References Cited

U.S. PATENT DOCUMENTS

| | | | |
|---|---|---|---|
| 3,031,356 A | | 4/1962 | Bousquet et al. |
| 3,060,068 A | * | 10/1962 | Hannes ........................ 428/218 |
| 3,505,147 A | * | 4/1970 | Eulie .......................... 156/321 |
| 3,660,200 A | | 5/1972 | Anderson et al. |
| 3,676,251 A | | 7/1972 | Young, Jr. et al. |
| 3,702,654 A | | 11/1972 | Younh, Jr. |
| 3,721,597 A | | 3/1973 | Colburn |
| 3,900,155 A | | 8/1975 | Rausing et al. |

(Continued)

FOREIGN PATENT DOCUMENTS

EP   0 314 118 A2   2/1991

(Continued)

*Primary Examiner*—Justin Fischer
(74) *Attorney, Agent, or Firm*—Buchanan Ingersoll & Rooney PC

(57) ABSTRACT

The invention relates to a method of producing packaging material in the form of a continuous laminate web (17) and being of the type which includes a core layer (2) of paper or cardboard whose one face displays a layer (7) which is disposed outside the core layer (2) and includes first an aluminium foil (4) and secondly a plastic coating (16) disposed outside the aluminium foil layer. Throughout its entire surface, the core layer (2) is covered with the above-mentioned layer (7), while along selected portions it extends out over the edges of the core layer (2). The above-mentioned layer (7) is formed in that the aluminium foil (4) and at least one thermoplastic material (6) are laminated to one another by being brought together between two rollers (10, 12) of which the one roller consists of a cooled roller and the other roller consists of a roller which is heated to a temperature exceeding the melting temperature of the thermoplastic. The above-mentioned formed layer (7) is brought together with the core layer (2) between two cooled rollers (13, 14) and co-laminated with the adhesive or binder layer of thermoplastic.

20 Claims, 2 Drawing Sheets

U.S. PATENT DOCUMENTS

Figure 1:
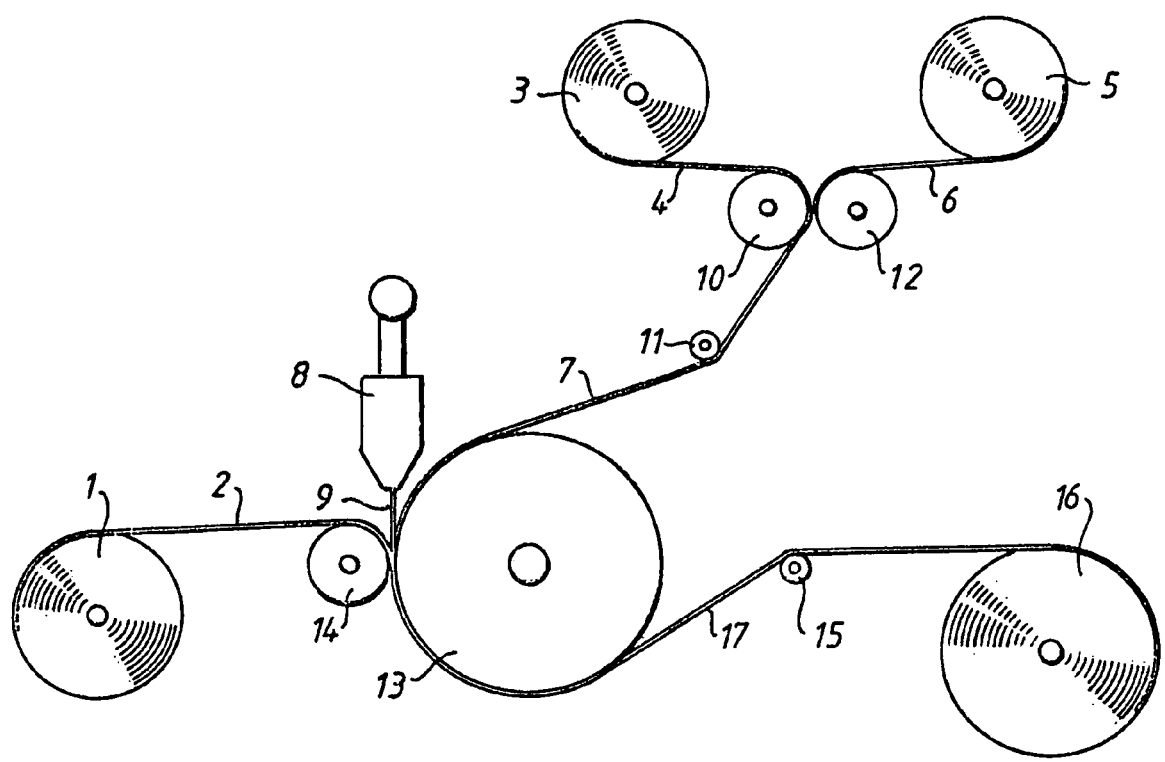

| | | | |
|---|---|---|---|
| 3,985,604 A | 10/1976 | Balla | |
| 4,067,763 A | 1/1978 | Mandersson | |
| 4,133,710 A | 1/1979 | Wartenberg | |
| 4,256,791 A | 3/1981 | Holmstrom et al. | |
| 4,266,993 A | 5/1981 | Olsen | |
| 4,354,886 A * | 10/1982 | Bergersen | 156/50 |
| 4,363,841 A * | 12/1982 | Snow | 383/108 |
| 4,371,364 A | 2/1983 | Rausing | |
| 4,387,126 A * | 6/1983 | Rebholz | 428/34.3 |
| 4,407,689 A * | 10/1983 | Ohtsuki et al. | 156/243 |
| 4,461,667 A | 7/1984 | Pupp | |
| 4,657,614 A * | 4/1987 | Andersson | 156/244.11 |
| 4,815,655 A | 3/1989 | Jacobsson et al. | |
| 4,861,409 A * | 8/1989 | Hashida et al. | 156/308.2 |
| 4,906,494 A | 3/1990 | Babinec et al. | |
| 5,077,104 A * | 12/1991 | Hunt et al. | 428/34.3 |
| 5,683,534 A | 11/1997 | Lofgren et al. | |
| 6,036,803 A | 3/2000 | Lasson et al. | |

FOREIGN PATENT DOCUMENTS

| | | | |
|---|---|---|---|
| GB | 2170486 | * | 8/1986 |
| JP | 4-41238 | | 2/1992 |

* cited by examiner

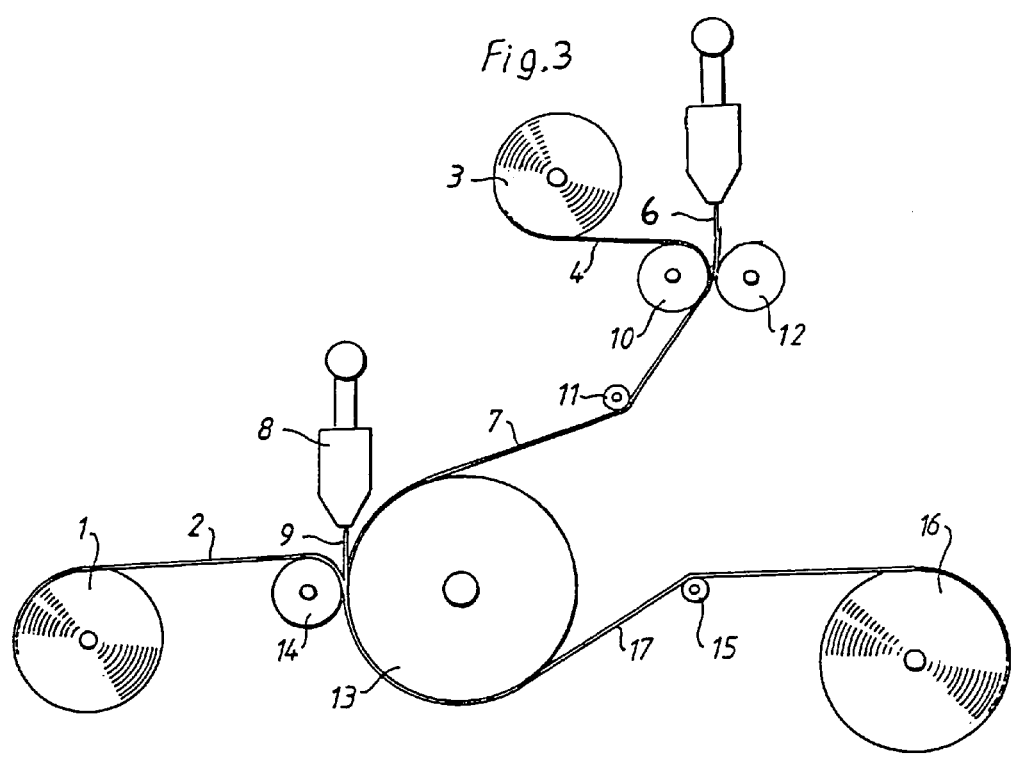

METHOD OF PRODUCING PACKAGING MATERIAL IN THE FORM OF A CONTINUOUS LAMINATE WEB

This application is a continuation of patent application Ser. No. 08/384,596 filed Feb. 3, 1995 now abandoned, which is a continuation of application Ser. No. 08/132,202 filed Oct. 6, 1993, now abandoned.

TECHNICAL FIELD

The present invention relates to a method of producing packaging material in the form of a continuous laminate web and of the type which comprises a core layer of paper or cardboard whose one face displays a layer disposed outside the core layer and including, on the one hand, a metal foil, preferably aluminium foil, and, on the other hand, a plastic coating disposed outside the metal foil layer and including one or more thermoplastic materials, the core layer being covered throughout its entire surface by said layer, while the layer extends over the edges of the core layer along selected portions.

BACKGROUND ART

Packaging containers of the single-use disposable type, in particular such packages for the storage of liquids, are often produced from a packaging material including a core layer of paper which is coated with thermoplastic material and aluminium foil. The packaging material is often provided in the form of webs rolled onto magazine reels, the webs, after being paid out from their magazine reels, being reformed by folding into packaging containers in automatic packaging machines. A commonly occurring package of this type is that which is marketed under the Trademark TETRA BRIK® and which is preferably employed for liquid contents such as milk, fruit juice, etc. This package is produced in automatic packaging and filling machines in such a manner that the web paid out from the magazine reel is reformed into a tube by the edges of the web being united in an overlap seam or joint, whereafter the thus formed tube is filled with the intended contents and separated into individual packages by repeated transverse seals disposed in spaced apart relationship from one another and at right angles to the tube. Once the supplied contents have thus been enclosed in sealed sections of the tube, these sections are separated from the tube by incisions in the above-mentioned transverse sealing zones. The separated tube sections are thereafter formed by folding along crease lines disposed in the packaging material, to form packaging containers of the desired configuration, for example, parallelepipedic containers.

Packages of this type are often fitted with opening arrangements in the form of holes, apertures or slits made in the packaging material and covered by tear-off strips which are normally entitled "pull-tabs". When the contents consist of a sterile product such as sterilized milk or of an acidic product such as, for instance, orange juice, the package is often manufactured from a packaging laminate which includes an aluminium foil layer making the package extremely tight to penetration by gases such as, for example, oxygen gas which might oxidize the contents of the package with resultant deterioration in quality. In order to achieve the desired tightness, it is of major importance that the aluminium foil layer is not ruptured or damaged in the package forming operation or on manufacture of the packaging material. In addition, for the function of the pull-tab opening, it is vital that the aluminium foil layer possesses extremely good adhesion at the region around the opening hole over which the pull-tabs are arranged to be applied (in a manner which will be described in greater detail hereinbelow) since otherwise the opening operation might easily be unsuccessful, since the covering strip which has been applied over the intended opening can be torn off without the inside coating of plastic and aluminium foil being properly opened.

One object of the present invention is to treat and prepare in a simple and efficient manner a packaging material web of the above-outlined type in such a way that the edge of the packaging material web is effectively sealed off with an upper plastic film disposed around the edge zone. It is known in the art to seal-off liquid absorbent material edges exposed to the inside of a packaging container with thermoplastic strips which overbridge or are folded around such edges. It is also known in the art, with the same purpose in view, to provide the packaging material web with a so-called fixed edge strip of plastic, i.e., with a plastic strip which projects from the web edge of a cardboard web and which may be folded around the edge and sealed against its opposing side. Such a "fixed edge strip" is obtained by disposing cardboard webs beside one another so that a slot or gap is formed between the webs, whereafter the webs and these slots are jointly covered over with a plastic foil or, in certain cases, with a plastic foil and an aluminium foil, whereafter the covered webs are separated by the means of an incision in the region of the slot for forming a projecting, fixed strip. One drawback has hitherto been that it has not been possible to achieve adhesion—or in any event only poor adhesion—between, for example, an aluminium foil layer and a plastic layer in the region of such slots, since the aluminium foil and the plastic layer cannot be compressed together within the region of the slot or incision and particularly not adjacent the defining edges of the slots because of the differing thicknesses of the material and the consequential difficulty for the pressure rollers to compress together the material within the region of the slot. However, employing the process according to the present invention, this drawback is obviated in that a plastic/aluminium foil layer is first produced in which the components in the laminate display good adhesion to one another, and this plastic/aluminium foil layer is then laminated to the above-mentioned side-by-side disposed webs of the core material layer which includes paper or cardboard.

Using prior art technology, packaging material of the type considered here can be produced by applying, in a plurality of separate lamination operations, the different layers—i.e. the aluminium foil layer, the inner plastic layer and so on to the core layer of paper or cardboard, and such a lamination process functions excellently in those cases when the core layer is not provided with holes, apertures or slots, i.e. the regions where the coating layers extend over or beyond edge zones of the core layer. It has proved that difficulties arise, in coating an aluminium foil against a core layer web of paper or cardboard in which the core layer is provided with holes, apertures or slots, in that the aluminium foil must, in connection with the lamination (in which the bonding lamination layer often consists of a thin extrudea thermoplastic film) be pressed against the core layer substrate with the aid of a nip roller or soft pressure roller in order that sufficient adhesion between the aluminium foil layer and the core layer can be achieved. Since, in general, the aluminium foil layer is extremely thin (of the order of approx 5 to 10μ), it will be forced by the nip roller against the edges around the apertures or the slots in the core layer and be partly pressed into these holes or apertures. Since the punched holes, apertures or the like have a relatively sharp edge, there is a risk that the aluminium be ruptured, and in any event the risk occurs that the aluminium foil will become creased around the edges of the apertures or slots and will thereby either be weakened or suffer from poor adhesion between the aluminium foil and the core layer precisely in the edge zones of the holes or apertures. Further, the adhesion between the plastic layer and the aluminium foil layer will be poor in the region of these holes or slots, since the pressure of the nip roller in such regions is limited because of the material thickness reduction in the holes or slots.

These circumstances have constituted a serious problem which, first, has caused ruptures in the aluminium foil layer and thereby insufficient gas tightness in the finished packages, secondly a defective opening arrangement because of poor adhesion between the aluminium foil layer and the core layer in the edge zones around the apertures, and thirdly poor adhesion between the aluminium foil layer and the plastic layer along those parts where the aluminium foil layer and the plastic layer project out beyond the core layer and, thus, receive no support from the core layer during the compression operation.

SUMMARY OF THE INVENTION

The above-outlined drawbacks are obviated in an efficient manner by the present invention which is characterized in that the layer of plastic coated aluminium foil disposed against the core layer is formed in that the metal foil and at least one thermoplastic material are laminated to one another by being brought together surface-to-surface between two rollers, of which the one roller consists of a cooled roller and the other consists of a roller which is heated to a temperature exceeding the melting temperature of the thermoplastic; and that the thus formed layer is united with the core layer between two cooled rollers; and that a binder or adhesive thermoplastic such as polyethylene is extruded in between the layer and the core layer.

BRIEF DESCRIPTION OF THE ACCOMPANYING DRAWING

Figure 2:
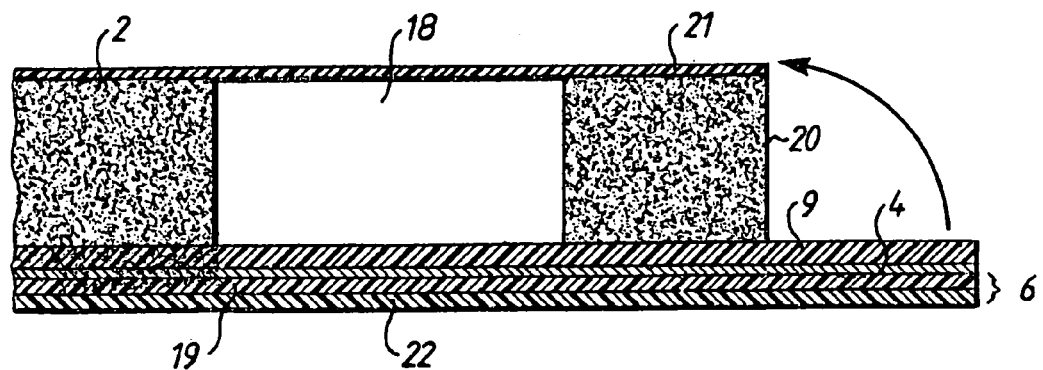

One example of the present invention will now be described in greater detail hereinbelow, with particular reference to the accompanying schematic Drawing, in which:

FIG. 1 schematically illustrates a laminator for producing the packaging material; and FIG. 2 shows, on a greatly magnified scale, a cross section of a laminate according to the present invention provided with a so-called fixed strip.

DESCRIPTION OF PREFERRED EXAMPLE

The apparatus for producing the laminate according to the present invention as schematically illustrated in FIG. 1 comprises a magazine reel 1 containing a web 2 of preferably fibrous material, eg. paper or cardboard, which on its one side may display a thin coating 21 of a thermoplastic material, for example polyethylene.

A magazine reel holding a thin aluminium foil web 4 (5–20μ) is designated 4 and a magazine reel holding a prefabricated laminate film 6 is designated 5.

Two cooperating rollers are given reference numerals 10 and 12, respectively, the roller 10 consisting of a heatable metal roller (preferably steel), while the roller 12 consists of a cooled roller (preferably a rubber roller). A bending roller over which the web 7 consisting of the co-laminated webs 4 and 6 is led carries reference numeral 11. Further, an extruder is designated 8, by means of which a molten thermoplastic film 9 (preferably polyethylene) can be extruded, and a nip roller is designated 14, yet a further cooled roller being designated 13. The finished laminate is designated 17, a further bending roller is designated 15 and a magazine reel for accommodating the finished packaging material is designated 16.

In FIG. 2, which shows a greatly magnified cross section through a packaging material according to the present invention, the base layer of the laminate has been given reference numeral 2 and a thin outside coating of thermoplastic has been given reference numeral 21. The base layer 2, which displays a punched portion 18 and an edge 20, has been united with a laminate 7 consisting of at least one layer 4 of aluminium foil and one layer of a prefabricated, preferably co-extruded film 6 displaying an inner side 19 (facing towards the aluminium foil) of EAA (Ethylene Acrylic Acid Ester), and a layer of polyethylene (preferably Low Density Polyethylene LDPE). A laminating layer, preferably consisting of polyethylene, has been given reference numeral 9.

As has been mentioned previously, the base layer 2 of the packaging laminate may contain holes or recesses which constitute opening holes or the like, and packaging material webs of the type contemplated here are similarly also often provided with an edge zone of plastic material which extends over the edge 20 of the base layer so as to cover the incision edge 20 of the base layer 2 and protect it against liquid absorption. The technical problems which occur on application of the inside layer 7 of the packaging web were dealt with and discussed by way of introduction, for which reason the following description will be limited so as to relate to how the material characteristic of the present invention is produced. The web layer 2 of the packaging material is unrolled from the magazine reel 1 and is led in to the nip between a nip roller 14 and a cooled roller 13.

From another magazine reel, a thin web of rolled aluminium foil is paid out, this web being united with the web 6 of a prefabricated co-extruded laminate of EAA and LDPE, paid out from another magazine reel 5. The two webs 4 and 6 are united with one another and accommodated between a heated steel roller 10 whose surface temperature must be between 150° and 200° C. (preferably approx. 150° C.), and a cooled roller 12 whose surface is clad with a resiliently yieldable material (eg. rubber). The two webs 4 and 6 which are brought into contact with the heated roller 10 and the cooled roller 12, respectively, are compressed between the rollers, in which event the aluminium foil (because of the contact with the heated roller 10) transfers heat to the EAA layer of the web 6, this being heated to such a level that it adheres to the aluminium foil 4 while the LDPE layer of the web 6 which is in direct contact with the cooled roller 12 is not heated to the same level as the EAA layer and moreover the LDPE layer has a melting and plasticizing temperature which exceeds the melting and plasticizing temperature of the EAA layer. The result will be that the webs 4 and 6 are combined to form the continuous united web 7 which displays good adhesion between the aluminium foil layer 4 and the web 6. In the illustrated example, the web 7 is passed over a bending roller 11 and is thereafter passed over the cooling roller 13 into the nip between the cooling roller 13 and the previously mentioned nip roller 14.

With the aid of the extruder 8, a molten plastic film preferably of polyethylene 9 is extruded in between the base layer 2 and the finished laminate 7, the aluminium foil of the laminate 7 being turned to face towards the extruder 8. In the nip between the nip roller 14 and the cooling roller 13, the webs 2 and 7 are brought together for the formation of the packaging material web 17 which is led over a bending roller 15 and finally rolled up on a magazine reel 16.

The method of production according to the present invention affords the advantage that the adhesion between the aluminium foil web 4 and the other layers of the laminate will be good and that the aluminium foil layer can be fixed to the base layer 2 also around edge zones and apertures of different types without crease formation around the edge zones or poor adhesion between the aluminium foil and the base layer 2 occurring around the edge zones.

The method according to the invention constitutes a solution to a technical problem which has long been well-known in the art, and contributes in raising the standard of quality of those packages which are manufactured from the produced laminate in that delamination between aluminium foil and plastic material is avoided, adhesion along edge portions between the material layers included is improved and ruptures and crease formation in, above all, the aluminium foil layer are avoided.

The present invention should not be considered as restricted to that described above and shown on the Drawing, many modifications being conceivable without departing from the spirit and scope of the appended Claims.

What is claimed is:

1. A method for producing a packaging material web comprising:
   conveying a thermoplastic layer toward a nip between a first pair of rollers, the first pair of rollers comprising first and second rollers, with the first roller being heated;
   conveying a metal foil towards the nip between the first pair of rollers;
   passing the thermoplastic layer and the metal foil concurrently through the nip between the first pair of rollers to compress the thermoplastic layer and the metal foil together while applying heat sufficient to adhere the thermoplastic layer to the metal foil to produce a united laminate web;
   conveying the united laminate web toward a nip between a second pair of rollers;
   conveying a core web of paper or cardboard provided with at least one through hole toward the nip between the second pair of rollers;
   extruding a thermoplastic adhesive between the united laminate web and the core web; and
   passing the united laminate web and the core web through the nip between the second pair of rollers with the thermoplastic adhesive between the core web and the united laminate web to join together the united laminate web and the core web and produce a packaging material web in which the at least one through hole in the core web is covered by the united laminate web and the metal foil of the united laminate web faces a first side of the core web.

2. The method according to claim 1, wherein the core web possesses a second side opposite the first side, the core web comprising a coating of a thermoplastic material on the second side that covers the at least one through hole.

3. The method according to claim 1, wherein the thermoplastic layer is a thermoplastic laminate comprising coextruded layers of EAA and LDPE.

4. The method according to claim 1, wherein the metal foil is passed through the nip between the first pair of rollers so that the metal foil contacts the first roller, the second roller of the first pair of rollers being a cooled roller.

5. The method according to claim 4, wherein the thermoplastic layer is a thermoplastic laminate comprising coextruded layers of EAA and LDPE and the thermoplastic laminate contacts the cooled roller.

6. The method according to claim 4, wherein the first roller is heated to a temperature between 150° C. and 200° C.

7. The method according to claim 1, further comprising passing the united laminate web over a bending roller before the united laminate web is passed through the nip of the second pair of rollers.

8. The method according to claim 7, wherein the metal foil is conveyed from a reel towards the nip between the first pair of rollers.

9. The method according to claim 8, wherein the thermoplastic layer is conveyed from a reel towards the nip between the first pair of rollers.

10. The method according to claim 1, wherein the thermoplastic layer is a thermoplastic laminate comprising an EAA layer and a LDPE layer, and wherein the EAA layer is bonded directly to the metal foil.

11. The method according to claim 1, wherein the metal foil has a thickness of $5\mu$ to $20\ \mu$.

12. A method for producing a packaging material web provided with an opening arrangement, which packaging material is subsequently converted into packaging containers filled with contents to be dispensed by way of the opening arrangement, the method comprising:
   conveying a thermoplastic layer toward a nip between a first pair of rollers, the first pair of rollers comprising first and second rollers, with the first roller being heated;
   conveying a metal foil towards the nip between the first pair of rollers;
   passing the thermoplastic layer and the metal foil concurrently through the nip between the first pair of rollers to compress the thermoplastic layer and the metal foil together while applying heat sufficient to adhere the thermoplastic layer to the metal foil to produce a united laminate web;
   conveying the united laminate web toward a nip between a second pair of rollers;
   conveying a core web of paper or cardboard provided with at least one through hole toward the nip between the second pair of rollers;
   extruding a thermoplastic adhesive between the united laminate web and the core web; and
   passing the united laminate web and the core web through the nip between the second pair of rollers with the thermoplastic adhesive between the core web and the united laminate web to join together the united laminate web and the core web and produce the packaging material web in which the at least one through hole in the core web is covered by the united laminate web to form the opening arrangement and the metal foil of the united laminate web faces a first side of the core web.

13. The method according to claim 12, wherein the core web possesses a second side opposite the first side, the core web comprising a coating of a thermoplastic material on the second side that covers the at least one through hole.

14. The method according to claim 12, wherein the thermoplastic layer is a thermoplastic laminate comprising coextruded layers of EAA and LDPE.

15. The method according to claim 12, wherein the metal foil is passed through the nip between the first pair of rollers so that the metal foil contacts the first roller, the second roller of the first pair of rollers being a cooled roller.

16. The method according to claim 15, wherein the thermoplastic layer is a thermoplastic laminate comprising coextruded layers of EAA and LDPE and the thermoplastic laminate contacts the cooled roller.

17. The method according to claim 15, wherein the first roller is heated to a temperature between 150° C. and 200° C.

18. The method according to claim 17, wherein the metal foil is conveyed from a reel towards the nip between the first pair of rollers.

19. The method according to claim 18, wherein the thermoplastic layer is conveyed from a reel towards the nip between the first pair of rollers.

20. The method according to claim 12, wherein the metal foil has a thickness of 5µ to 20 µ.

* * * * *